C. PERLEY.
Shoes.
No. 6,354.
Reissued March 30, 1875
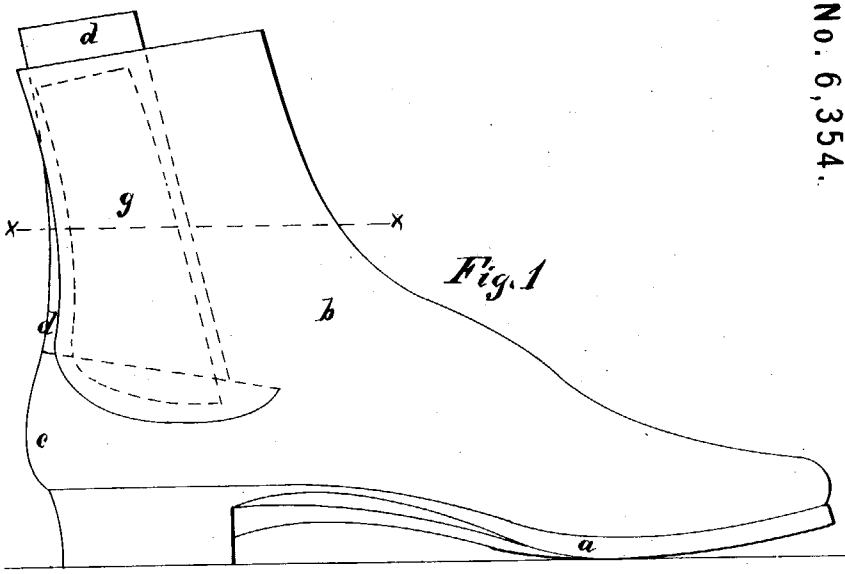
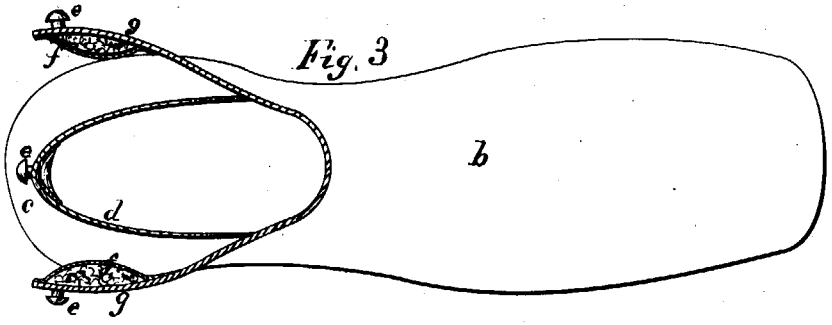
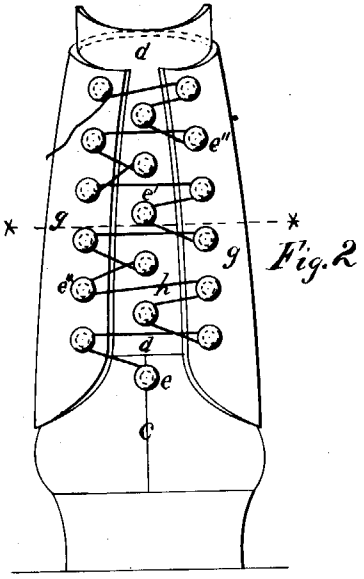
WITNESSES
Granville Lewis
M. L. Lynch
By
INVENTOR
Charles Perley
Hill & Ellsworth
Attorneys.

UNITED STATES PATENT OFFICE.

CHARLES PERLEY, OF NEW YORK, N. Y., ASSIGNOR TO CALVIN HERSOME, OF BOSTON, MASSACHUSETTS.

IMPROVEMENT IN SHOES.

Specification forming part of Letters Patent No. 75,048, dated March 3, 1868; reissue No. 6,354, dated March 30, 1875; application filed March 19, 1875.

*To all whom it may concern:*

Be it known that I, CHARLES PERLEY, of New York city, county and State of New York, have invented an Improved Shoe; and I I do hereby declare the following to be a full and exact description of the same, reference being had to the accompanying drawings forming a part of this specification, in which—

Figure 1 is a side elevation. Fig. 2 is a rear elevation, and Fig. 3 is a section in line *x x* of Fig. 1.

Similar letters of reference in the accompanying drawings denote the same parts.

In boots there is of necessity a space in the rear portion above the heel, that allows the boot to be drawn upon the foot, but which space is not filled either by the heel or ankle. In shoes the rear portion has been shaped with a view to accommodate the heel, but the opening, being along the instep, to be laced up or buttoned, or else at the sides closed with elastic webbing, the shoe is often strained and injured by being pulled on, and the back seam generally is the first portion to give way.

The object of my invention is to enable the boot or shoe to accommodate the heel and fit perfectly around the heel and ankle, and at the same time adapt it to be pulled on and off easily without straining or injuring it at any point. To this end the invention consists, first, in a boot or shoe, the back or heel opening of which is formed substantially as I will proceed to set forth; secondly, in a padded back which allows for variation in the size and shape of the wearer's heel; thirdly, in pads employed in the rear portion of the boot or shoe above the heel, and at the sides of the tendon; and, fourthly, in the provision for keeping the flaps and back properly in place.

In the drawings, *a* represents the sole of the boot or shoe. *b* is the front portion of the uppers, shaped as usual, but of a size to extend around to or near the back of the foot, made either in one or more pieces of leather or other material, and terminating in flaps *g g*, the lower and rear edges of which fit around under the projecting processes of the ankle-bones, and up behind the same, conforming to the shape of that part of the foot, substantially as shown in Figs. 1, 2. *c* is the counter or heel portion of the uppers, which is extended up in the form of a tongue or back, *d*, beneath the back lacing or fastening, to close the space between the flaps *g g*, and also to facilitate the drawing on of the boot or shoe. Any desired mode of fastening the flaps *g g* and the back *d*, to hold them securely in place, may be adopted, but I have shown in the drawings a mode of accomplishing that object by means of buttons *e e′ e″* attached, respectively, to the counter, the back, and the two flaps, around which may be passed a suitable cord or fastening, *h*, elastic, if preferred, to draw the flaps together at or near their lower rear corners, hold all the parts securely in their proper relative positions, and yet allow entire freedom of movement to the ankle. The lacing or fastening straps, of whatever kind, might be passed from flap to flap without engaging in any way with the buttons *e e′* on the counter and back, but when thus applied the flaps and the back are liable to work up or down, and cause the parts about the heel to fit badly, whereas, by engaging the flap-fastenings with the check button or buttons on the heel or tongue, and particularly with the lower button or check *e*, neither the flaps nor the back can work out of place. The padding *f*, applied within the flaps *g g*, fills up the hollow portion of the ankle above the heel, for the purposes aforesaid. A padding is applied at the inner side of the back *d* to make the same more comfortable at the point of contact of the boot with the foot, by equalizing and diffusing the pressure of the lacing, and at the same time stiffening the back.

I claim as my invention—

1. A shoe, with side openings, in which the front-quarters overlap the back-quarters, and have their lower rear edges drawn toward each other by a fastening extending across the back near the heel.

2. A boot or shoe having flaps *g g*, combined with a back, *d*, and a check or checks, substantially as described.

3. A shoe, having side openings, the front quarters overlapping the back quarters, and cut in such a pattern that the rear edges of the front quarters fall in the recess back of and below the ankle-joint and above the heel, substantially as and for the purposes specified.

4. A boot or shoe opening at the sides, and provided with a check or checks, *e*, at the back portion thereof to prevent the parts from working out of place.

5. The padding, applied at *f* within the rear portion of the boot or shoe, substantially as and for the purposes specified.

6. The padded back *d*, substantially as and for the purposes specified.

7. The buttons or fastenings along the back *d*, between the flaps *g g*, substantially as and for the purposes set forth.

CHARLES PERLEY.

Witnesses:
MORTIMER J. ENNIS,
WM. H. RIBLET.